(12) United States Patent
Lo

(10) Patent No.: US 10,487,977 B2
(45) Date of Patent: Nov. 26, 2019

(54) SUPPORTING ASSEMBLY AND ELECTRONIC DEVICE USING THE SAME

(71) Applicant: PEGATRON CORPORATION, Taipei (TW)

(72) Inventor: Chien-Sheng Lo, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/166,275

(22) Filed: Oct. 22, 2018

(65) Prior Publication Data
US 2019/0186683 A1 Jun. 20, 2019

(30) Foreign Application Priority Data
Dec. 15, 2017 (TW) .............................. 106218692 U

(51) Int. Cl.
*G06F 1/16* (2006.01)
*F16M 13/00* (2006.01)
*E05D 11/00* (2006.01)
*E05D 3/12* (2006.01)

(52) U.S. Cl.
CPC ............ *F16M 13/005* (2013.01); *E05D 3/12* (2013.01); *E05D 11/00* (2013.01); *G06F 1/166* (2013.01); *G06F 1/1641* (2013.01); *G06F 1/1643* (2013.01); *G06F 1/1681* (2013.01); *E05Y 2900/606* (2013.01)

(58) Field of Classification Search
CPC ......... F16M 13/005; E05D 3/12; E05D 11/00; G06F 1/1641; G06F 1/1643; G06F 1/166; G06F 1/1681; E05Y 2900/606
See application file for complete search history.

(56) References Cited

U.S. PATENT DOCUMENTS

| D587,711 | S | 3/2009 | Han | |
|---|---|---|---|---|
| 9,417,658 | B2* | 8/2016 | Fan | ................ F16M 11/10 |
| 2011/0074257 | A1* | 3/2011 | Li | ................ F16M 11/10 |
| | | | | 312/223.1 |
| 2012/0275094 | A1* | 11/2012 | Zhou | ................ H04M 1/04 |
| | | | | 361/679.01 |

(Continued)

FOREIGN PATENT DOCUMENTS

| CN | 101510111 A | 8/2009 |
|---|---|---|
| TW | D133901 | 3/2010 |

*Primary Examiner* — Hoa C Nguyen
*Assistant Examiner* — Christopher L Augustin
(74) *Attorney, Agent, or Firm* — McClure, Qualey & Rodack, LLP

(57) ABSTRACT

Disclosed is a supporting component, including a pivoting frame, a rotary bracket, and a support frame. The pivoting frame includes an accommodation space and a plurality of stop grooves. The rotary bracket has a first end portion and a second end portion, where the first end portion is pivotally disposed on the pivoting frame. The support frame is pivotally disposed on the rotary bracket, where an abutting piece is provided on one end of the support frame away from the rotary bracket. When the supporting assembly is in a use state, the rotary bracket causes, by using the first end portion as an axis of rotation, the second end portion to keep away from the accommodation space, and the support frame rotates relative to the rotary bracket, so that the abutting piece of the support frame abuts against any one of the stop grooves.

5 Claims, 6 Drawing Sheets

(56) References Cited

U.S. PATENT DOCUMENTS

| | | | |
|---|---|---|---|
| 2016/0219735 A1* | 7/2016 | Zhang | F16M 11/10 |
| 2016/0273702 A1* | 9/2016 | Shiba | F16M 13/005 |
| 2017/0045911 A1* | 2/2017 | Ho | G06F 1/1626 |
| 2019/0018449 A1* | 1/2019 | Fenton | G06F 1/166 |

* cited by examiner

SUPPORTING ASSEMBLY AND ELECTRONIC DEVICE USING THE SAME

CROSS-REFERENCE TO RELATED APPLICATION

This non-provisional application claims priority under 35 U.S.C. § 119(a) to Patent Application No. 106218692 filed in Taiwan, R.O.C. on Dec. 15, 2017, the entire contents of which are hereby incorporated by reference.

BACKGROUND

Technical Field

The application relates to a supporting assembly and an electronic device using the same, and in particular, to a supporting assembly that can be used in a foldable electronic device to cause the electronic device to be used vertically, and an electronic device.

Related Art

Nowadays, tablet electronic devices are increasingly popular, and almost everyone uses a tablet computer. However, during use, if a tablet computer needs to be used or read vertically, in most cases, a protective case or a support that has a supporting function needs to be bought and installed additionally.

In addition, current notebook computers also tend to be manufactured to be thinner, and even, a screen can be rotated by 360 degrees to rotate to a back surface of a case at the other side, to be used as a tablet computer, or a screen is rotated by 180 degrees to lay flat for use.

However, regardless of any angle to which a notebook computer is rotated, the notebook computer still needs to be laid flat on a desktop for use, and cannot be erected at a particular angle for use.

SUMMARY

With the advancement of science and technology and the advancement of touchscreen technologies, existing tablet computers or notebook computers may be foldable, so that when being unfolded for use, display screens at two sides may form an all-in-one screen to increase a display area, or two sides may be respectively used as a display screen and a touch keyboard for use. When a tablet computer or a notebook computer is changed to have a foldable display screen structure, if the tablet computer or the notebook computer needs to be used vertically, apparently, an existing manner of adding a protective case is no longer applicable.

In view of this, an embodiment of the application provides a supporting assembly, including a pivoting frame, a rotary bracket, and a support frame. The pivoting frame includes an accommodation space and a plurality of stop grooves, where the stop grooves are provided in the accommodation space. The rotary bracket has a first end portion and a second end portion, where the first end portion is pivotally disposed on the pivoting frame. The support frame is pivotally disposed on the rotary bracket, where an abutting piece is provided on one end of the support frame away from the rotary bracket. When in a folded state, the rotary bracket and the support frame are accommodated in the accommodation space; and when in a use state, the rotary bracket causes, by using the first end portion as an axis of rotation, the second end portion to keep away from the accommodation space, and the support frame rotates relative to the rotary bracket, so that the abutting piece of the support frame abuts against any one of the stop grooves.

Another embodiment of the application provides an electronic device, including two housings, a pivoting frame, a rotary bracket, and a support frame. The two housings are separately pivotally disposed on the pivoting frame, and the pivoting frame includes an accommodation space and a plurality of stop grooves, where the stop grooves are provided in the accommodation space. The rotary bracket has a first end portion and a second end portion, where the first end portion is pivotally disposed on the pivoting frame. The support frame is pivotally disposed on the rotary bracket, where an abutting piece is provided on one end of the support frame away from the rotary bracket. When in a folded state, the rotary bracket and the support frame are accommodated in the accommodation space; and when in a use state, the rotary bracket causes, by using the first end portion as an axis of rotation, the second end portion to keep away from the accommodation space, and the support frame rotates relative to the rotary bracket, so that the abutting piece of the support frame abuts against any one of the stop grooves.

Therefore, the supporting assembly may be disposed at a position for the two housings to relatively pivot in the electronic device, so that the electronic device has a support structure, and a protective case having a support structure does not need to be bought additionally. During use, only the rotary bracket and the support frame need to be rolled out, to provide a supporting function, so that the electronic device can be used vertically. In addition, because in the folded state, the rotary bracket and the support frame can be both accommodated in the pivoting frame, when a user does not use the supporting assembly, judging from an appearance, it is considered that there is no protruding element or there is no component that affects visual aesthetic of the appearance. Further, because the rotary bracket and the support frame can be completely accommodated, no inconvenience is caused when they are carried.

The detailed features and advantages of the application are described below in detail in the following embodiments, the content of the detailed description is sufficient for a person skilled in the art to understand the technical content of the application and to implement the application accordingly. Based on the content of the specification, the claims, and the drawings, a person skilled in the art can easily understand the relevant objectives and advantages of the application.

BRIEF DESCRIPTION OF THE DRAWINGS

The application will become more fully understood from the detailed description given herein below for illustration only, and thus are not limitative of the application, and wherein.

DETAILED DESCRIPTION OF THE EMBODIMENTS

Figure 1:
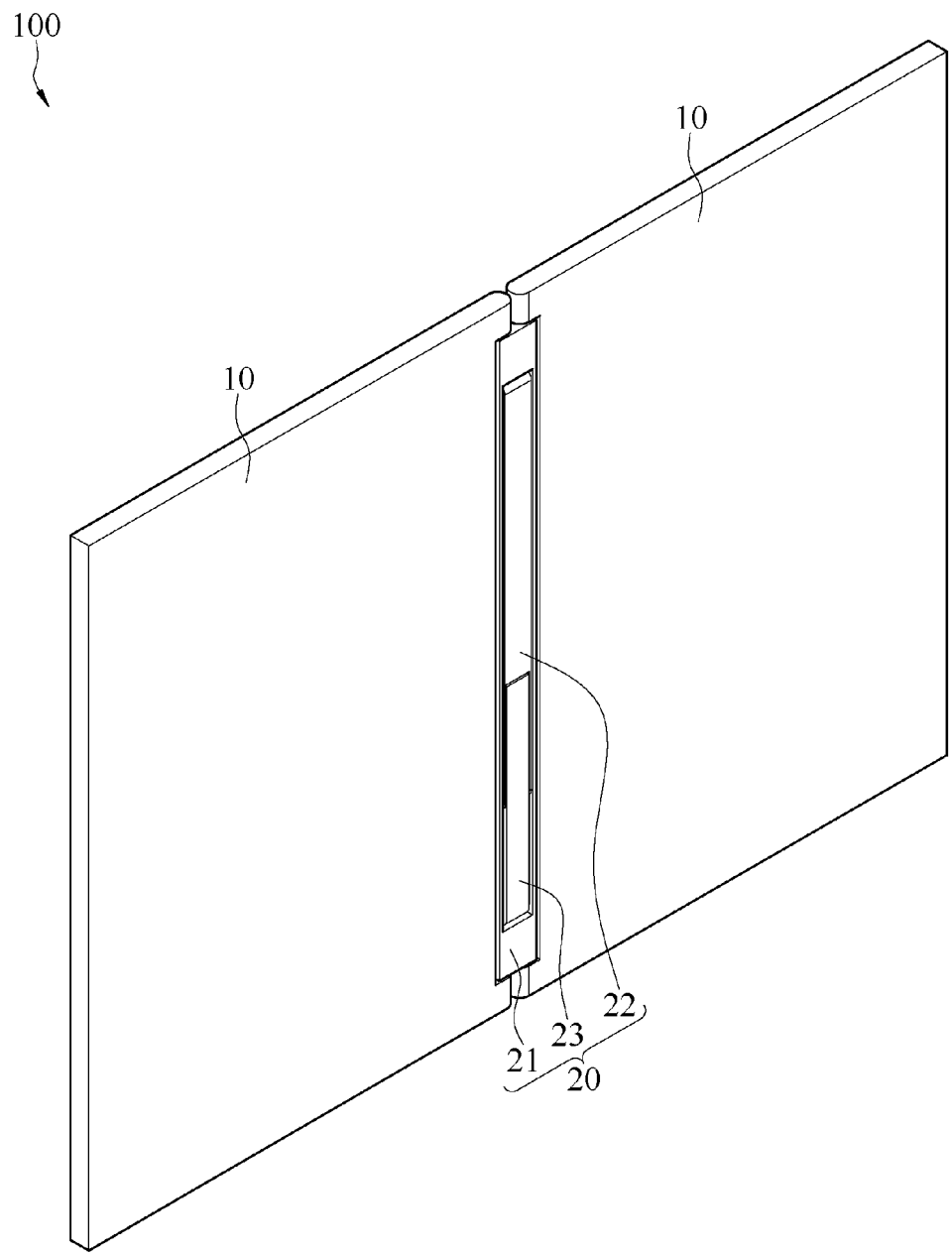
FIG. 1 is a schematic diagram of an unfolded state of an electronic device according to a first embodiment of the application.
Figure 2:
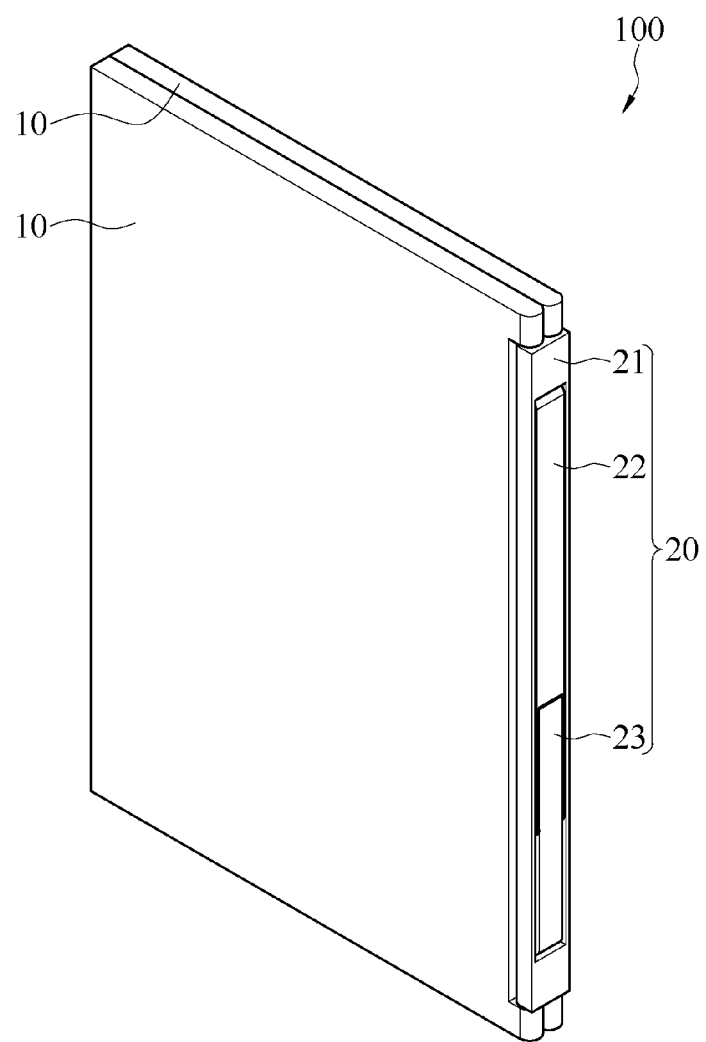
FIG. 2 is a schematic diagram of a folded state of the electronic device according to the first embodiment of the application.
Figure 3:
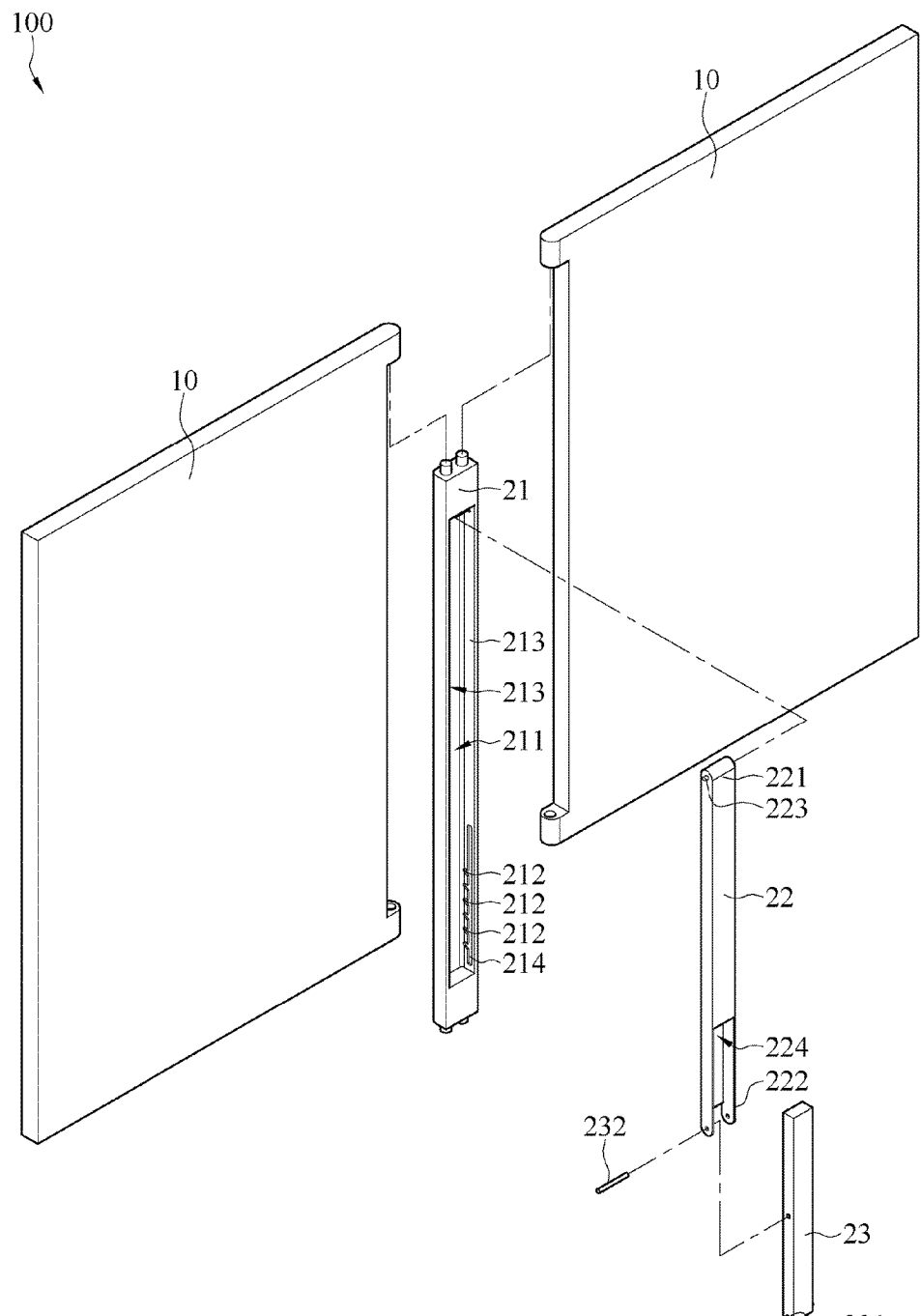
FIG. 3 is an exploded view of a supporting assembly according to the first embodiment of the application.
Figure 4:
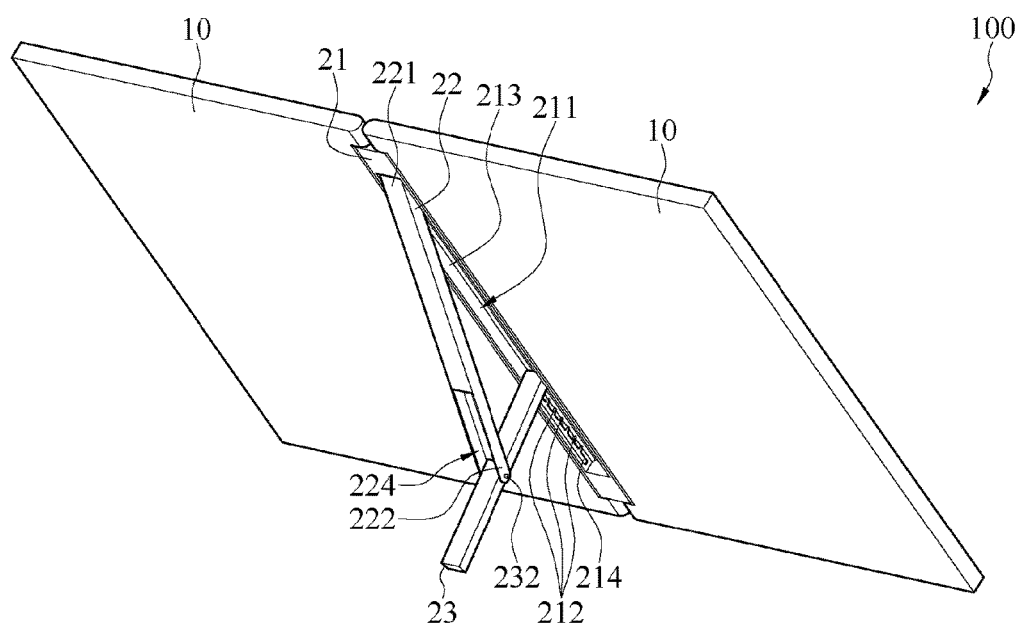
FIG. 4 is a schematic diagram of a use state of the supporting assembly according to the first embodiment of the application.

Referring to FIG. 1 to FIG. 4, FIG. 1 is a schematic diagram of an unfolded state of an electronic device according to a first embodiment of the application; FIG. 2 is a schematic diagram of a folded state of the electronic device according to the first embodiment of the application; FIG. 3 is an exploded view of a supporting assembly according to the first embodiment of the application; and FIG. 4 is a schematic diagram of a use state of the supporting assembly according to the first embodiment of the application. In this embodiment, an electronic device 100 includes two housings 10 and a supporting assembly 20. The supporting assembly 20 includes a pivoting frame 21, a rotary bracket 22, and a support frame 23. In this embodiment, a foldable and packable electronic device 100 is used as an example for description. The supporting assembly 20 may be disposed on an electronic device 100 of any size, so that it is more convenient when the electronic device 100 needs to be erected on a desktop for viewing and use.

The pivoting frame 21 of the supporting assembly 20 includes an accommodation space 211 and a plurality of stop grooves 212. It may be learned from FIG. 3 and FIG. 4 that, the stop groove 212 is provided in the accommodation space 211. In this embodiment, in a rectangular pivoting frame 21, a recess is provided to form the accommodation space 211, but the application is not limited thereto. The pivoting frame 21 may have any shape and is not limited to having a rectangular shape, and the accommodation space 211 is not limited to only a rectangular recess, as long as the accommodation space 211 can be used to accommodate an object, and has a side wall on which the stop groove 212 can be provided.

In this embodiment, the stop groove 212 is disposed at a position close to the bottom of the accommodation space 211 in a direction shown in the figure, but the application is not limited thereto. Alternatively, the entire accommodation space 211 may be completely disposed in the stop groove 212, so that the support frame 23 can be stopped at any position, and therefore can be adjusted to more angles, and a user can have more choices to adjust to a required viewing angle or height. It may be learned from FIG. 3 and FIG. 4 that, in this embodiment, the stop groove 212 has a U shape, and is inclined from bottom to top, so that the support frame 23 can more easily slide and be positioned.

The rotary bracket 22 has a first end portion 221 and a second end portion 222, where the first end portion 221 is pivotally disposed on the pivoting frame 21. It may be learned from FIG. 3 that, a central pivot 223 penetrates through the first end portion 221 of the rotary bracket 22, and then is assembled into an upper end portion of the accommodation space 211. In this way, the rotary bracket 22 can rotate relative to the pivoting frame 21 by using the central pivot 223 as an axle center, to rotate to be accommodated into the accommodation space 211, or rotate to keep away from the accommodation space 211.

The support frame 23 is pivotally disposed on the second end portion 222 of the rotary bracket 22. An abutting piece 231 is provided on one end of the support frame 23 away from the rotary bracket 22. It may be learned from FIG. 3 that, a central pivot 232 penetrates through the support frame 23, and the support frame 23 is pivotally disposed on the second end portion 222 of the rotary bracket 22 by using the central pivot 232, so that the support frame 23 can rotate relative to the rotary bracket 22 by using the central pivot 232 as an axle center. The abutting piece 231 is located on one end of the support frame 23 close to the bottom, to slide into and be positioned in the stop groove 212.

Next, referring to all of FIG. 1 to FIG. 4, when the supporting assembly 20 is in a folded state (as shown in FIG. 1), the rotary bracket 22 and the support frame 23 are accommodated in the accommodation space 211. When the user needs to erect the electronic device 100 for viewing, the supporting assembly 20 is switched to a use state. When in the use state (as shown in FIG. 4), the rotary bracket 22 causes, by using the first end portion 221 as an axis of rotation, the second end portion 222 to keep away from the accommodation space 211, and the support frame 23 rotates relative to the rotary bracket 22, so that the abutting piece 231 of the support frame 23 abuts against any one of the plurality of stop grooves 212.

When the housing 10 needs to be assembled on the pivoting frame 21 of the supporting assembly 20, the housing 10 may be pivotally disposed by using a simple pivoting structure.

Alternatively, a pivoting axis may be disposed additionally, or a pivoting component is assembled.

In this way, supported by the supporting assembly 20, the electronic device 100 can be erected on the desktop for viewing, and can be adjusted according to a required viewing angle. In this way, the electronic device 100 has a support structure, and a protective case having a support structure does not need to be bought additionally. During use, only the rotary bracket 22 and the support frame 23 need to be rolled out, to provide a supporting function, so that the electronic device 100 can be used vertically. In addition, because in the folded state, the rotary bracket 22 and the support frame 23 can be both accommodated in the pivoting frame 21, when the user does not use the supporting assembly 20, judging from an appearance, it is considered that there is no protruding element or there is no component that affects visual aesthetic of the appearance. Further, because the rotary bracket 22 and the support frame 23 can be completely accommodated in the pivoting frame 21, no inconvenience is caused when they are carried.

In addition, as shown in FIG. 2 and FIG. 3, a recess 224 is provided on the second end portion 222 of the rotary bracket 22, and in the folded state, one end of the support frame 23 on which the abutting piece 231 is not disposed is accommodated in the recess 224. In the use state, the support frame 23 can cause, by using the central pivot 232 as an axle center, the end accommodated in the recess 224 to keep away from the recess 224, and support on the desktop, as shown in FIG. 4. If the length of the support frame 23 is increased, the supporting assembly 20 can be adjusted to more angles, and it is easier to rotate the support frame 23.

Further, it may be learned from FIG. 3 and FIG. 4 that, in this embodiment, the plurality of stop grooves 212 are distributed on two opposite side walls 213 of the accommodation space 211, and stop grooves 212 on the left and right side walls 213 are disposed correspondingly, to provide firm support. However, in another implementation mode, the stop grooves 212 may be disposed only on a side wall at a single side, or the stop grooves 212 are recessed on the bottom of the accommodation space 211.

Next, the pivoting frame 21 further includes two guide slots 214 that are correspondingly disposed on the two side walls 213 of the accommodation space 211, and each guide slot 214 is in communication with a plurality of stop grooves 212 located on a same side wall 213. In this way, the abutting piece 231 of the support frame 23 can slide into the guide slot 214, to cause the abutting piece 231 to slide into the stop groove 212 more easily, and a limiting means is added for the support frame 23, so that the support frame 23 cannot be easily detached from the pivoting frame 21. Therefore, in a process of carrying the support frame 23, a case in which the support frame 23 is completely detached from the accommodation space 211 is avoided.

Figure 5:
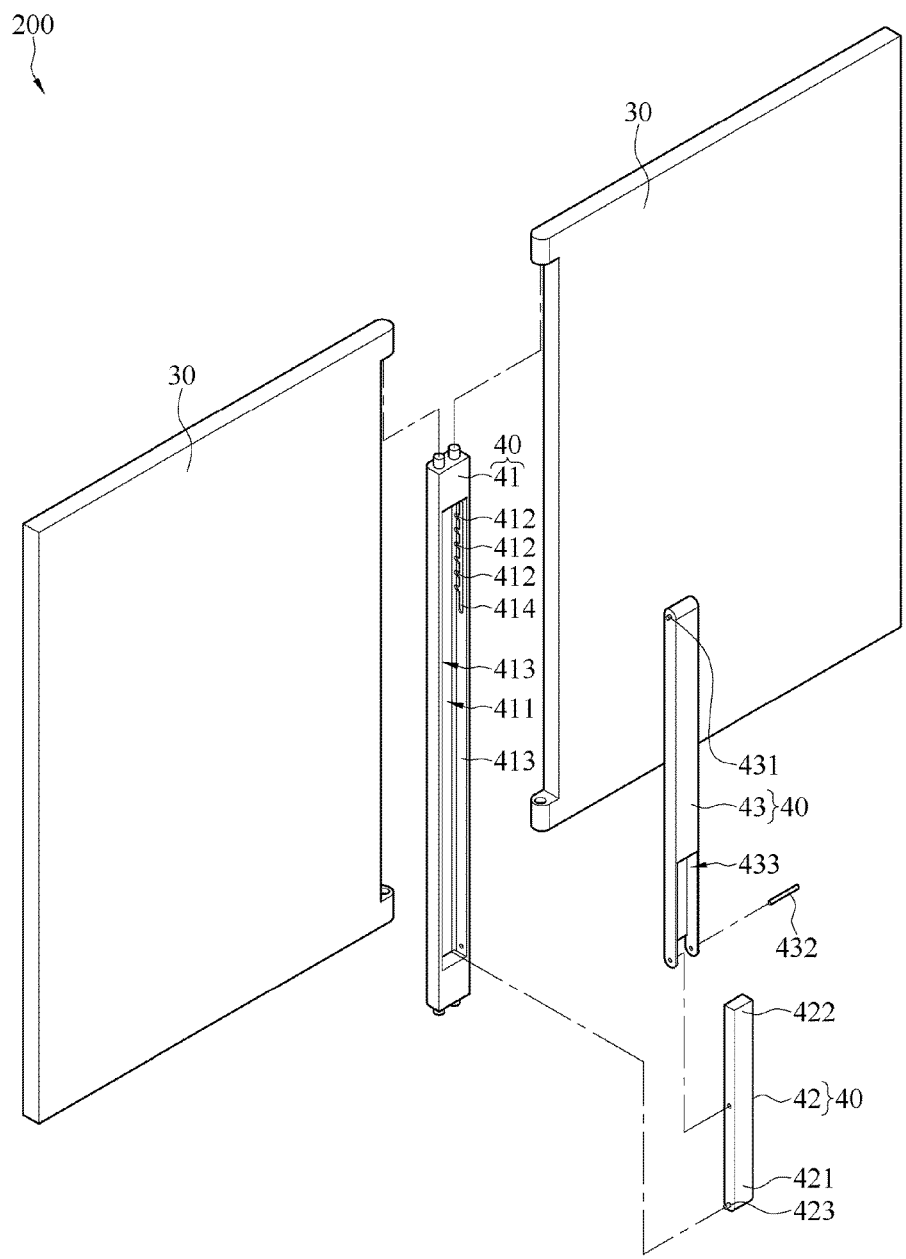
FIG. 5 is an exploded view of a supporting assembly according to a second embodiment of the application.
Figure 6:
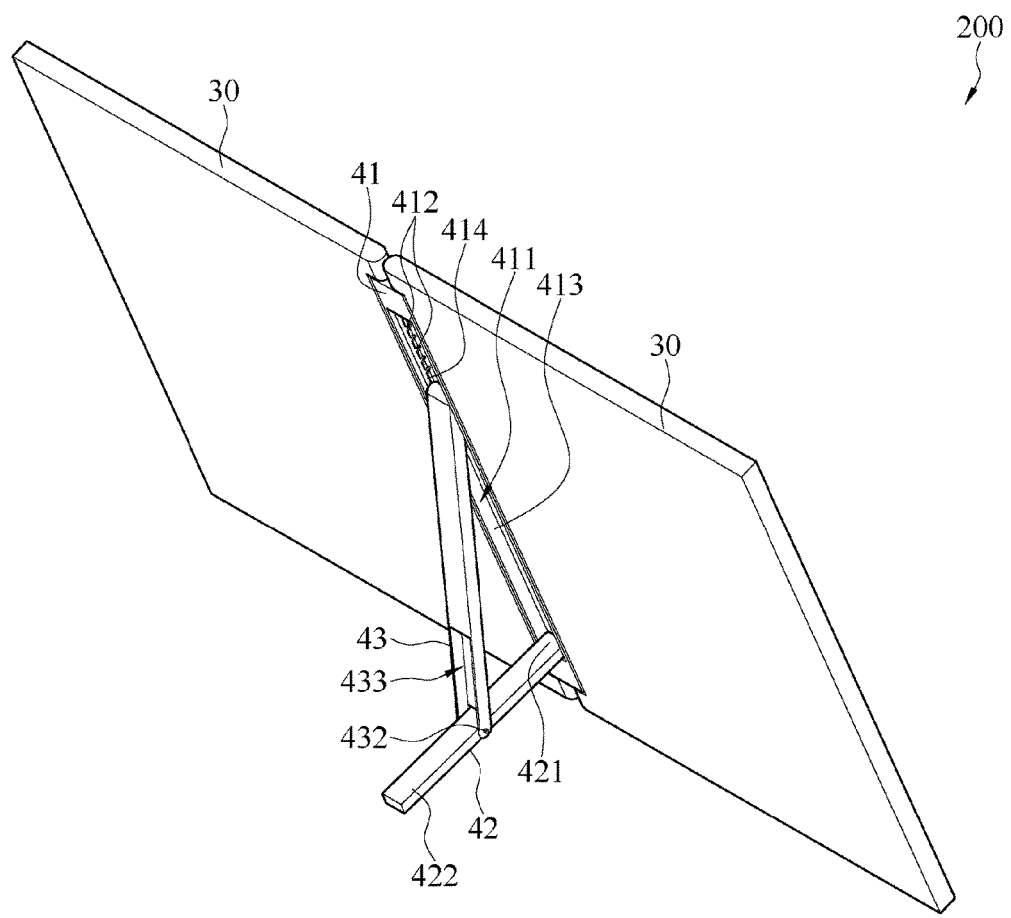
FIG. 6 is a schematic diagram of a use state of the supporting assembly according to the second embodiment of the application.

Subsequently, referring to FIG. 5 and FIG. 6, FIG. 5 is an exploded view of a supporting assembly according to a second embodiment of the application; and FIG. 6 is a schematic diagram of a use state of the supporting assembly according to the second embodiment of the application. In this embodiment, an electronic device 200 includes two housings 30 and a supporting assembly 40. The supporting assembly 40 includes a pivoting frame 41, a rotary bracket 42, and a support frame 43. In this embodiment, a foldable and packable electronic device 200 is used as an example for description. The supporting assembly 40 may be disposed on an electronic device 200 of any size, so that it is more convenient when the electronic device 200 needs to be erected on a desktop for viewing and use. A difference between this embodiment and the first embodiment lies in disposition manners and positions of the rotary bracket and the support frame, and detailed descriptions are provided below.

The pivoting frame 41 of the supporting assembly 40 includes an accommodation space 411 and a plurality of stop grooves 412. It may be learned from FIG. 5 and FIG. 6 that, the stop groove 412 is provided in the accommodation space 411. The same as the first embodiment, in this embodiment, for the accommodation space 411, in a rectangular pivoting frame 41, a recess is provided to form the accommodation space 411, but the application is not limited thereto. The pivoting frame 41 may have any shape and is not limited to having a rectangular shape, and the accommodation space 411 is not limited to only a rectangular recess, as long as the accommodation space 411 can be used to accommodate an object, and has a side wall on which the stop groove 412 can be provided.

In this embodiment, the stop groove 412 is disposed at a position close to the top of the accommodation space 411 in a direction shown in the figure, but the application is not limited thereto. Alternatively, the entire accommodation space 411 may be completely disposed in the stop groove 412, so that the support frame 43 can be stopped at any position, and therefore can be adjusted to more angles, and a user can have more choices to adjust to a required viewing angle or height. It may be learned from FIG. 5 and FIG. 6 that, in this embodiment, the stop groove 412 has a U shape, and is inclined from bottom to top, so that the support frame 43 can more easily slide and be positioned.

The rotary bracket 42 has a first end portion 421 and a second end portion 422, where the first end portion 421 is pivotally disposed on the pivoting frame 41. It may be learned from FIG. 5 that, a central pivot 423 penetrates through the first end portion 421 of the rotary bracket 42, and then is assembled into a lower end portion of the accommodation space 411. In this way, the rotary bracket 42 can rotate relative to the pivoting frame 41 by using the central pivot 423 as an axle center, to rotate to be accommodated into the accommodation space 411, or rotate to keep away from the accommodation space 411.

The support frame 43 is pivotally disposed on the rotary bracket 42. An abutting piece 431 is provided on one end of the support frame 43 away from the rotary bracket 42. It may be learned from FIG. 5 that, the support frame 43 uses a central pivot 432 to cause the central pivot 432 to penetrate through both the rotary bracket 22 and the support frame 43, and the support frame 43 is pivotally disposed on the rotary bracket 22. In this way, the support frame 43 can rotate relative to the rotary bracket 42 by using the central pivot 432 as an axle center. The abutting piece 431 is located on one end of the support frame 43 close to the top, to slide into and be positioned in the stop groove 412.

Next, referring to both FIG. 5 and FIG. 6, when the supporting assembly 40 is in a folded state (refer to FIG. 1), the rotary bracket 42 and the support frame 43 are accommodated in the accommodation space 411. When the user needs to erect the electronic device 200 for viewing, the supporting assembly 40 is switched to a use state. When in the use state (as shown in FIG. 6), the rotary bracket 42 causes, by using the first end portion 421 as an axis of rotation, the second end portion 422 to keep away from the accommodation space 411, and the support frame 43 rotates relative to the rotary bracket 42, so that the abutting piece 431 of the support frame 43 abuts against any one of the plurality of stop grooves 412.

When the housing 30 needs to be assembled on the pivoting frame 41 of the supporting assembly 40, the housing 10 may be pivotally disposed by using a simple pivoting structure. Alternatively, a pivoting axis may be disposed additionally, or a pivoting component is assembled.

In this way, supported by the supporting assembly 40, the electronic device 200 can also be erected on the desktop for viewing, and can be adjusted according to a required viewing angle. In this way, the electronic device 200 has a support structure, and a protective case having a support structure does not need to be bought additionally. During use, only the rotary bracket 42 and the support frame 43 need to be rolled out, to provide a supporting function, so that the electronic device 200 can be used vertically. In addition, because in the folded state, the rotary bracket 42 and the support frame 43 can be both accommodated in the pivoting frame 41, when the user does not use the supporting assembly 40, judging from an appearance, it is considered that there is no protruding element or there is no component that affects visual aesthetic of the appearance. Further, because the rotary bracket 42 and the support frame 43 can be completely accommodated in the pivoting frame 41, no inconvenience is caused when they are carried.

In addition, as shown in FIG. 5 and FIG. 6, a recess 433 is provided on an end portion of the support frame 43 on which the abutting piece 431 is not disposed, and in the folded state, the second end portion 422 of the rotary bracket 42 is accommodated in the recess 433. In the use state, the rotary bracket 42 can cause, by using the central pivot 432 as an axle center, the second end portion 422 accommodated in the recess 433 to keep away from the recess 433, and support on the desktop, as shown in FIG. 6. If the length of the second end portion 422 of the rotary bracket 42 is increased, the supporting assembly 40 can be adjusted to more angles, and it is easier to rotate the rotary bracket 42.

Further, it may be learned from FIG. 5 and FIG. 6 that, in this embodiment, the plurality of stop grooves 412 are distributed on two opposite side walls 413 of the accommodation space 411, and stop grooves 412 on the left and right side walls 413 are disposed correspondingly, to provide firm support. However, in another implementation mode, the stop grooves 412 may be disposed only on a side wall at a single side, or the stop grooves 412 are recessed on the bottom of the accommodation space 411.

Next, the pivoting frame 41 further includes two guide slots 414 that are correspondingly disposed on the two side walls 413 of the accommodation space 411, and each guide slot 414 is in communication with a plurality of stop grooves 412 located on a same side wall 413. In this way, the abutting piece 431 of the support frame 43 can slide into the guide slot 414, to cause the abutting piece 431 to slide into the stop groove 412 more easily, and a limiting means is added for the support frame 43, so that the support frame 43 cannot be easily detached from the pivoting frame 41. Therefore, in a process of carrying the support frame 43, a case in which the support frame 43 is completely detached from the accommodation space 411 is avoided.

Although the application has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electronic device, comprising:
   two housings; and
   a supporting assembly, comprising:
   a pivoting frame, wherein the two housings are separately pivotally disposed on the pivoting frame, and the pivoting frame comprises an accommodation space and a plurality of stop grooves, wherein the stop grooves are provided in the accommodation space;
   a rotary bracket, having a first end portion and a second end portion, wherein the first end portion is pivotally disposed on the pivoting frame; and
   a support frame, pivotally disposed on the rotary bracket, and having an abutting piece which is provided on one end of the support frame away from the rotary bracket,
   wherein when the supporting assembly is in a folded state, the rotary bracket and the support frame are accommodated in the accommodation space; and when the supporting assembly is in a use state, the rotary bracket causes, by using the first end portion as an axis of rotation, the second end portion to keep away from the accommodation space, and the support frame rotates relative to the rotary bracket, so that the abutting piece of the support frame abuts against any one of the stop grooves.

2. The electronic device according to claim 1, wherein a recess is provided on the second end portion of the rotary bracket, and in the folded state, one end of the support frame on which the abutting piece is not disposed is accommodated in the recess.

3. The electronic device according to claim 1, wherein a recess is provided on one end portion of the support frame on which the abutting piece is not disposed, and in the folded state, the second end portion of the rotary bracket is accommodated in the recess.

4. The electronic device according to claim 1, wherein the stop grooves are disposed on two opposite side walls of the accommodation space.

5. The electronic device according to claim 4, wherein the pivoting frame further comprises two guide slots that are correspondingly provided on the two side walls of the accommodation space, and each guide slot is in communication with stop grooves located on a same side wall.

* * * * *